US011044327B2

(12) United States Patent
Lau et al.

(10) Patent No.: US 11,044,327 B2
(45) Date of Patent: Jun. 22, 2021

(54) SYSTEMS AND METHODS FOR WIRELESS SERVICE MIGRATION

(71) Applicant: Verizon Patent and Licensing Inc., Arlington, VA (US)

(72) Inventors: Priscilla Lau, Concord, CA (US); Ye Huang, San Ramon, CA (US)

(73) Assignee: Verizon Patent and Licensing Inc, Basking Ridge, NJ (US)

( * ) Notice: Subject to any disclaimer, the term of this patent is extended or adjusted under 35 U.S.C. 154(b) by 303 days.

(21) Appl. No.: 16/007,390

(22) Filed: Jun. 13, 2018

(65) Prior Publication Data

US 2019/0387065 A1 Dec. 19, 2019

(51) Int. Cl.
| | | |
|---|---|---|
| *H01L 29/08* | (2006.01) | |
| *H04L 29/08* | (2006.01) | |
| *H04W 8/20* | (2009.01) | |
| *H04W 4/50* | (2018.01) | |
| *G06F 16/16* | (2019.01) | |
| *G06F 16/21* | (2019.01) | |

(52) U.S. Cl.
CPC ............ *H04L 67/18* (2013.01); *G06F 16/162* (2019.01); *G06F 16/214* (2019.01); *H04W 4/50* (2018.02); *H04W 8/20* (2013.01)

(58) Field of Classification Search
CPC ............................... H04L 67/18; G06F 14/303
USPC ........................................................ 709/217
See application file for complete search history.

(56) References Cited

U.S. PATENT DOCUMENTS

2009/0172092 A1* 7/2009 Nakagawa ......... H04N 7/17354
709/203
2017/0303169 A1* 10/2017 Hampel .............. H04L 12/2801

\* cited by examiner

*Primary Examiner* — Sibte H Bukhari

(57) ABSTRACT

Devices, methods, and storage media provide for receiving, from user equipment (UE), a request for service data of select service data stored via a wireless service in a wireless network, the request including a user identifier (ID) associated with the UE; determining, based on the user ID, whether the request is received within a migration period that is set for migrating the select service data from a first application server to a second application server in the wireless network; determining, when within the migration period, whether the requested service data has previously been migrated to the second application server; identifying, when not previously migrated, a location of the requested service data in the first application server; retrieving the requested service data; deleting the requested service data; migrating the requested service data to the second application server; and providing access to the UE to the requested service data.

20 Claims, 9 Drawing Sheets

SYSTEMS AND METHODS FOR WIRELESS SERVICE MIGRATION

BACKGROUND INFORMATION

Wireless carriers deploy application servers in a wireless carrier network to store/manage subscriber communication data generated by subscribers via their mobile communication devices using applications such as text messaging services, voice messaging services, image-sharing services, video communication services, multimedia messaging services, and the like. Such communication data may include, for instance, text files, audio files, image files, video files, multimedia files, etc., in various formats, that are retained in designated application servers and retrievable by the subscriber for a set time period (e.g., 30 days) from the date/time they are generated and/or stored. At some point, circumstances may necessitate that, going forward, an alternative application server be assigned by the wireless carrier to store/manage a subscriber's communication data generated using such wireless service. In other cases, a subscriber could switch to a different wireless carrier where interoperable standard-based services may be provided to the subscriber.

DETAILED DESCRIPTION OF PREFERRED EMBODIMENTS

Figure 1:
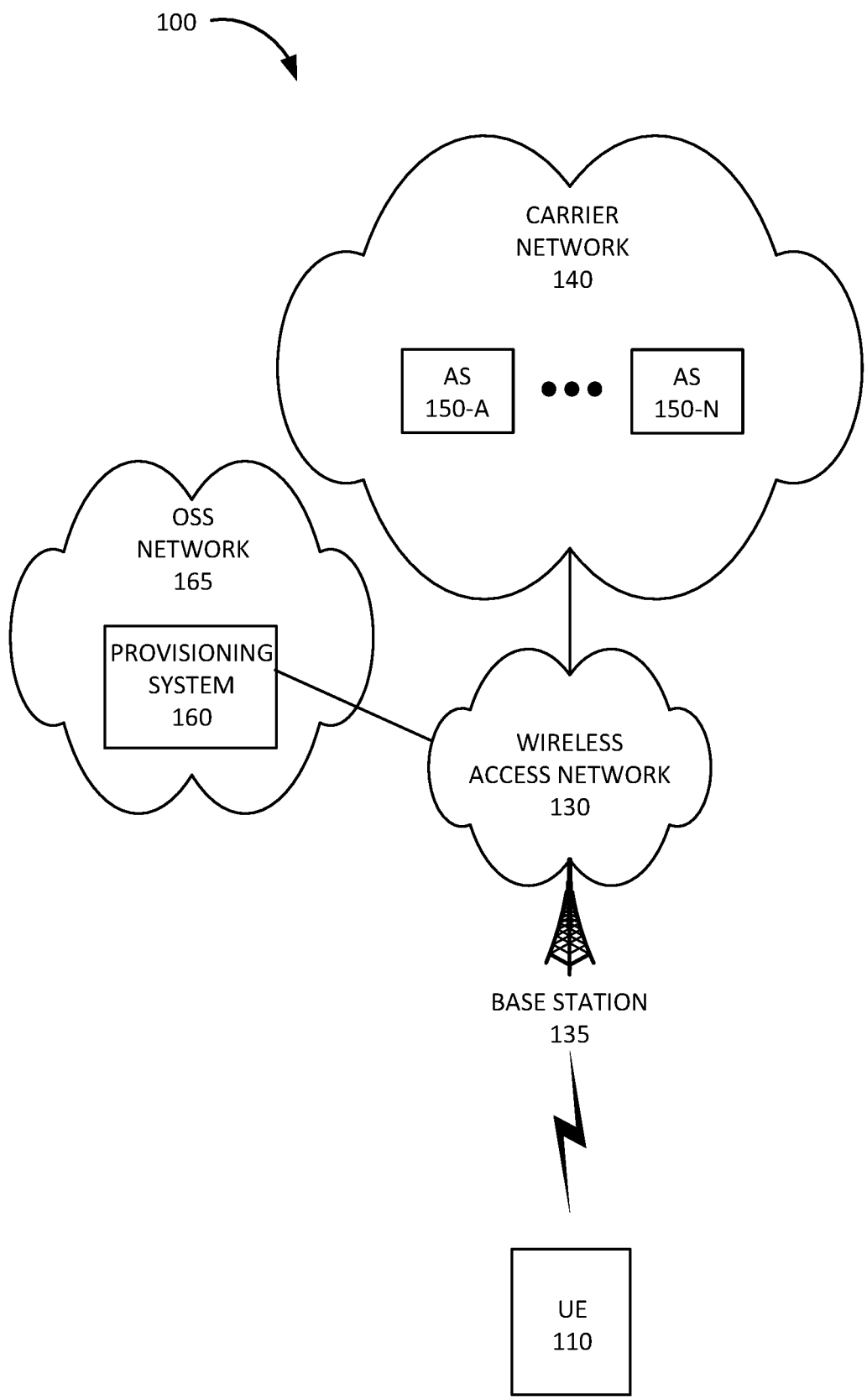
FIG. 1 is a diagram illustrating an environment according to an implementation described herein.

The following detailed description refers to the accompanying drawings. The same reference numbers in different drawings identify the same or similar elements.

As data traffic and the number of user equipment (UE) devices using wireless access networks increase, the number of different types of wireless service options and the number of different types of data generated/transmitted also increase. For example, Rich Communication Services (RCS) is a communication protocol between wireless carriers, and between subscribers' UE and the wireless carrier, which is designed to provide standardized services as a part of its specifications, including Standalone Messaging, 1-to-1 Chat, Group Chat, File Transfer, Content Sharing, Social Presence Information, IP Voice calling, Best Effort Video calling, Geolocation Exchange, Audio Messaging, Network-based blacklists, Capability Exchange based on Presence or Session Initiation Protocol (SIP) OPTIONS, etc. With the development of such data-intensive communications applications, wireless access networks may need to support an ever-increasing number of data storage/retrieval alternatives for subscribers' time-based service data that is subject to purging (aged-out). For example, a wireless carrier may occasionally move/migrate a subscriber to a different Home Subscriber Server (HSS) or a different application (App) server. "Re-homing" a subscriber (or "service migration") may require employing a new regional database or App server and/or splitting a single HSS or a single App server into multiple servers. Ideally, storage solutions should also address subscribers' needs for retrieving stored service data when switching from one wireless carrier to another wireless carrier.

Typically, when subscribers are migrated to a different HSS and/or App server associated with a wireless service, the stored service data (e.g., voicemails, MMS messages, SMS messages, etc.) is not retained by the wireless carrier and thus permanently irretrievable by the subscriber. Only subscriber profiles are carried over from one HSS to another. A subscriber may have a third party, for example, make a copy of the service data using static, offline, and nonselective (i.e., bulk) replication that is inefficient and resource-intensive. To reduce unnecessary data migration through a wireless carrier's core network and thereby conserve limited network resources (e.g., database storage), a dynamic, on-demand subscriber service data migration system may be implemented (across Apps) in the core network for devices, such as UE devices, that are subject to re-homing within the wireless network.

Switching from a current HSS to another HSS and/or between a current App server to another App server may be implemented, for example, according to instructions from a provisioning system in an Operation Support System (OSS) network that is used to, among other things, manage subscriber re-homing operations for the wireless carrier. And dynamic, on-demand selective data migration may be initiated by a subscriber's request for data retrieval using a wireless service. Selective data migration between network databases (e.g., App servers) may be performed using a carrier's core network device configured to function as an App exchange management (AEM) node.

An HSS, which stores a subscriber profile for a UE device, may receive a message from the provisioning system, which includes instructions for re-homing the UE device with respect to a current HSS or App server, and forward the message to the AEM node in the wireless carrier's core network. The AEM node may send to one or more App servers associated with Apps identified in the message, a message requesting metadata corresponding to stored service data for one or more identified Apps. In response to the message, the App server may generate a message containing App metadata for each identified App and send the message to the AEM node.

App servers may enable and/or manage a wireless communication service for subscribers. For example, the App server may provide RCS messaging between a subscriber UE and other UE devices in a wireless network and store, for example, text messages, video messages, and/or other type of communications generated by and/or exchanged between the UE devices, as data files in any number of formats. App servers may store metadata corresponding to the data files in a number of different formats.

A wireless network may include multiple HSS devices. For example, different HSS devices may be used in different geographic regions or for resilience and/or scalability reasons. Each HSS device deployed in a wireless network may be able to service a limited number of UE devices, and when the limit is approached, one or more subscribers and the associated UE devices may need to be re-homed to a different HSS device. Additionally, for any number of reasons, a wireless carrier may need to split a single HSS device into multiple devices. When a subscriber physically relocates to another geographic location, the associated UE devices may need to be re-homed to a different HSS. Subscribers and the associated UE devices switching between wireless carriers need to be re-homed to a different HSS.

FIG. 1 is a diagram of an exemplary environment 100 in which the systems and/or methods, described herein, may be implemented. As shown in FIG. 1, environment 100 may include a UE device 110, a wireless access network 130, a carrier network 140, and an OSS network 165.

UE device 110 may correspond to a mobile communication device that communicates wirelessly with other communication devices and/or network devices in wireless networks, such as Public Land Mobile Networks (PLMNs). A "wireless carrier network," as used herein, may include a wireless network, such as a PLMN or satellite network that is owned, operated, and/or administered by a particular wireless network provider. A "first wireless carrier network" and a "second wireless carrier network" therefore, are used herein to distinguish between two different wireless networks.

UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; a Machine-to-Machine (M2M) device, or an "Internet of Things" (IoT) device; and/or any other type of computer device with wireless communication capabilities and a communication interface. UE device 110 may be used for voice communication, mobile broadband services (e.g., video streaming, real-time gaming, premium Internet access etc.), best effort data traffic, and/or other types of applications.

Wireless access network 130 may provide access to carrier network 140 for wireless devices, such as UE device 110. Wireless access network 130 may enable UE device 110 to connect to carrier network 140 for mobile telephone service, Short Message Service (SMS) message service, Multimedia Message Service (MMS) message service, RCS message service, Internet access, cloud computing, and/or other types of data services. Wireless access network 130 may include a base station 135 via which UE device 110 may wirelessly communicate with wireless access network 130. Wireless access network 130 may establish a packet data network connection between UE device 110 and carrier network 140 via one or more Access Point Names (APNs). For example, wireless access network 130 may establish an Internet Protocol (IP) connection between UE device 110 and carrier network 140.

In some implementations, wireless access network 130 may include a Long Term Evolution (LTE) network, including a wireless access network and an evolved packet core (EPC) network. In other implementations, wireless access network 130 may include a Code Division Multiple Access (CDMA) access network. For example, the CDMA access network may include a CDMA enhanced High Rate Packet Data (eHRPD) network (which may provide access to an LTE network).

Furthermore, wireless access network 130 may include an LTE Advanced (LTE-A) access network and/or a Fifth Generation (5G) access network or other advanced network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Carrier network 140 may include a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Carrier network 140 may allow the delivery of Internet Protocol (IP) services to UE device 110, and may interface with external networks. Carrier network 140 may include server devices and/or network devices, or other types of computation or communication devices. In some implementations, carrier network 140 may include an Internet Protocol Multimedia Sub-system (IMS) network (not shown in FIG. 1). An IMS network may include a network for delivering IP multimedia services and may provide media flows between UE device 110 and external IP networks or external circuit-switched networks (not shown in FIG. 1). Carrier network 140 may include App servers (AS's) 150-A to 150-N (referred to herein individually as "AS 150" and collectively as "AS's 150").

AS 150 may include one or more devices, such as computer devices and/or server devices, which receive uplink data from UE device 110 and/or which send downlink data to UE device 110. For example, AS 150 may be configured to process service data from UE device 110, to store service data from UE device 110, such as voicemail data files, text messaging data files, video messaging data files, etc., to receive billing information for UE device 110, to receive location information from UE device 110, to receive requests for instructions from UE device 110, to receive requests for updates from UE device 110, and/or to send/receive other types of information from UE device 110. Additionally or alternatively, AS 150 may be configured to provide standardized services to UE device 110, including Standalone Messaging, 1-to-1 Chat, Group Chat, File Transfer, Content Sharing, Social Presence Information, IP Voice calling, Best Effort Video calling, Geolocation Exchange, Audio Messaging, Network-based blacklists, Capability Exchange based on Presence or SIP OPTIONS, etc.

Provisioning system 160 may include devices, such as computer devices and/or server devices of OSS network 165 that includes a user interface that allows network personnel to manage carrier network 140 and/or network elements in carrier network 140 (e.g., AS 150). For example, provisioning system 160 may execute a series of provisioning steps to enable a particular service for a particular subscriber line on a particular UE device 110. The provisioning steps may include provisioning system 160 generating an instruction and sending the instruction to a particular network device (not shown in FIG. 1), such as a routing device (e.g., a router, a switch, a firewall, a getaway, etc.), a wireless access network device (e.g., base station 135, a Mobility Management Entity (MME), a Serving Gateway (SGW), a Packet Data Network Gateway (PGW), an HSS, an AEM node, etc.), an IMS device (e.g., an App server, a Call Session Control Function (CSCF) device, etc.), a messaging server (e.g., an SMS server, an MMS server, an Instant Messaging (IM) server, a voicemail server, etc.), an authentication server (e.g., a Diameter server, an Authentication, Authorization, and Accounting (AAA) server), etc.), an update server (e.g., an Over-the-air (OTA) server), and/or another type of network device.

Provisioning system 160 may activate UE device 110, based on receiving a request from AS 150, and select a particular HSS to store the subscriber profile for UE device 110. Provisioning system 160 may further send an indication to an AEM node to inform the AEM node that UE device 110 is to be re-homed and may provide information identifying the HSS associated with UE device 110. Moreover, provisioning system 160 may generate instructions to the AEM node for re-homing UE device 110 at another HSS to store the subscriber profile for UE device 110.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
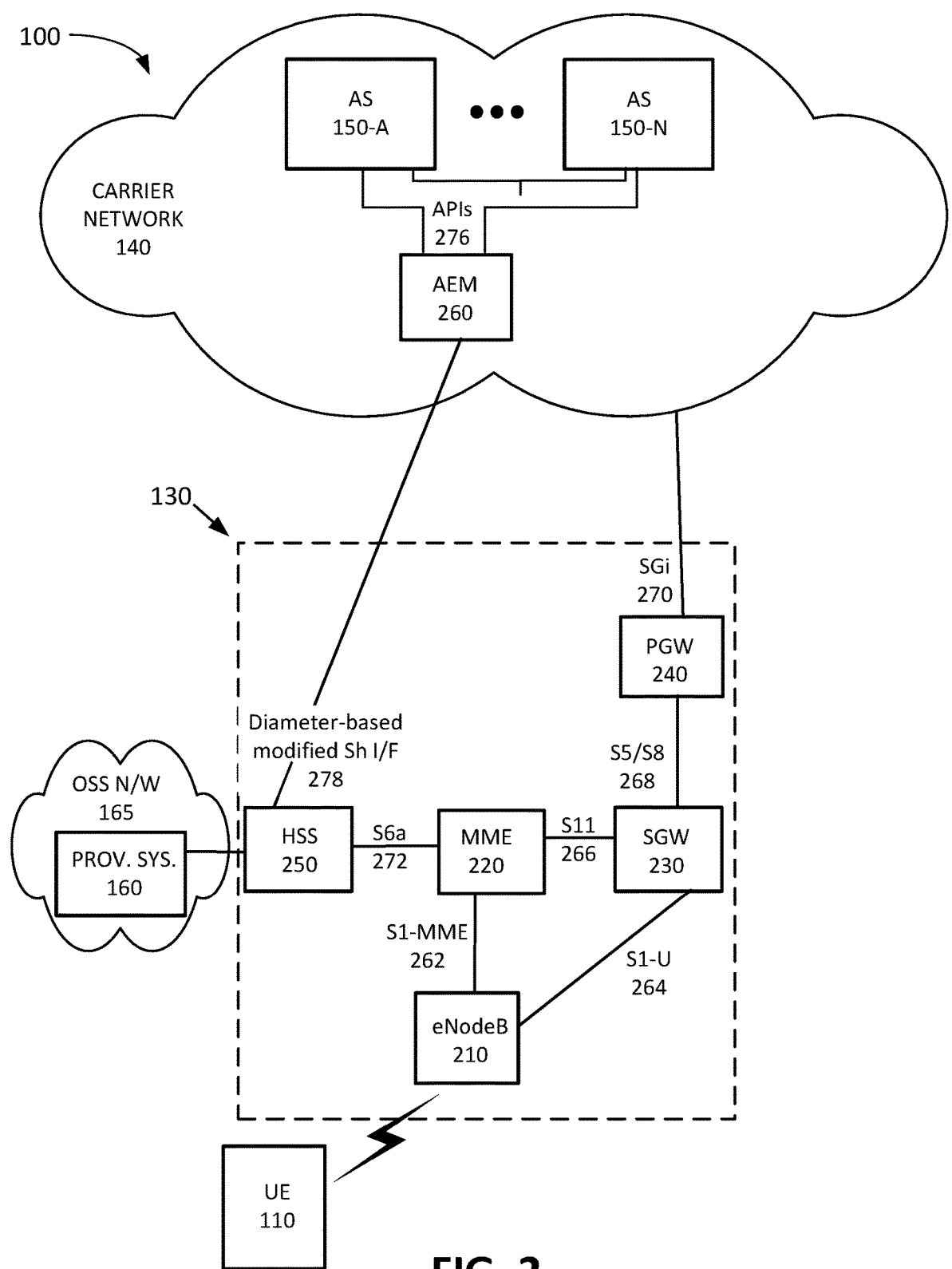
FIG. 2 is a diagram illustrating exemplary components of the access and core networks of FIG. 1.

FIG. 2 is a diagram illustrating exemplary components of wireless access networks 130 in the context of environment 100 according to an implementation described herein. As shown in FIG. 2, wireless access network 130 may include eNodeB 210 (corresponding to base station 135), an MME 220, an SGW 230, a PGW 240, and an HSS 250. While FIG. 2 depicts wireless access network 130 having a single eNodeB 210, MME 220, SGW 230, PGW 240, and HSS 250 for illustration purposes, in practice, wireless access network 130 may include multiple eNodeBs 210, MMES 220, SGWs 230, PGWs 240, and HSS's 250.

eNodeB 210 may include one or more devices (e.g., base stations 135) and other components and functionality that allow UE device 110 to wirelessly connect to wireless access network 130. eNodeB 210 may include or be associated with one or more cells. For example, each cell may include a radio frequency (RF) transceiver facing a particular direction. eNodeB 210 may interface with wireless access network 130 via an interface referred to as an S1 interface, which may be split into a control plane S1-MME interface 262 and a data plane S1-U interface 264. S1-MME interface 262 may interface with MME 220. S1-MME interface 262 may be implemented, for example, with a protocol stack that includes a NAS protocol and/or Stream Control Transmission Protocol (SCTP). An S1-U interface 264 may interface with SGW 230 and may be implemented, for example, using GTPv2.

MME 220 may implement control plane processing for wireless access network 130. For example, MME 220 may implement tracking and paging procedures for UE device 110, may activate and deactivate bearers for UE device 110, may authenticate a user of UE device 110, and may interface to non-LTE wireless access networks. A bearer may represent a logical channel with particular quality of service (QoS) requirements. MME 220 may also select a particular SGW 230 for a particular UE device 110. A particular MME 220 may interface with other MMES 220 in wireless access network 130 and may send and receive information associated with UE devices 110, which may allow one MME 220 to take over control plane processing of UE devices serviced by another MME 220, if the other MME 220 becomes unavailable. Furthermore, MME 220 may manage non-IP communication with UE 110 using NAS.

SGW 230 may provide an access point to and from UE device 110, may handle forwarding of data packets for UE device 110, and may act as a local anchor point during handover procedures between eNodeBs 210. SGW 230 may interface with PGW 240 through an S5/S8 interface 268. S5/S8 interface 268 may be implemented, for example, using GTPv2.

PGW 240 may function as a gateway to carrier network 140 through an SGi interface 270. A particular UE device 110, while connected to a single SGW 230, may be connected to multiple PGWs 240, one for each packet network with which UE device 110 communicates. For example, a particular PGW 240 may be associated with a particular APN and UE device 110 may connect to the particular APN by connecting to the PGW 240 associated with the particular APN. Thus, UE device 110 may be connected to one or more APNs at a particular time.

MME 220 may communicate with SGW 230 through an S11 interface 266. S11 interface 266 may be implemented, for example, using GTPv2. S11 interface 266 may be used to create and manage a new session for a particular UE device 110. S11 interface 266 may be activated when MME 220 needs to communicate with SGW 230, such as when the particular UE device 110 attaches to wireless access network 130, when bearers need to be added or modified for an existing session for the particular UE device 110, when a connection to a new PGW 240 needs to be created, or during a handover procedure (e.g., when the particular UE device 110 needs to switch to a different SGW 230).

HSS 250 may store information associated with UE devices 110 and/or information associated with users of UE devices 110. For example, HSS 250 may store subscription profiles that include authentication and access authorization information. Each subscription profile may include information identifying UE device 110, authentication and/or authorization information for UE device 110, services enabled and/or authorized for UE device 110, App lists for UE device 110, and/or other types of information associated with UE device 110. MME 220 may communicate with HSS 250 through an S6a interface 272. S6a interface 272 may be implemented, for example, using a Diameter protocol.

AEM 260 may function as an interface between AS 150 and UE device 110 for accessing AS's 150. Thus, AEM 260 may expose the services and/or capabilities of AS 150 to UE devices 110. AEM 260 may communicate with AS 150 via an Application Programming Interface (API) 276. AEM 260 may maintain information associating UE device 110 with a particular HSS 250 that stores the subscriber profile for UE device 110. Furthermore, AEM 260 may manage, based on instructions from provisioning system 160 received via HSS 250, re-homing of UE 110 from one AS 150 to another, and the migration of stored service data from one AS 150 to another. As described in more detail below, AEM 260 may maintain the metadata structure among different AS 150's such that when UE device 110 is rehomed from one AS 150 to another AS 150, AEM 260 can enable data transfer and translation, if needed, when AS 150 performs on-demand data migration from the previous AS 150 content storage to the new AS 150 content storage. Data translation may be needed while old AS 150 and the new AS 150 use different data format, data structure, and/or technology to store service data associated with the user.

Although FIG. 2 shows exemplary components of wireless access network 130, in other implementations, wireless access network 130 may include fewer components, different components, differently arranged components, or additional components than depicted in FIG. 2. For example, according to other exemplary embodiments, HSS 250 may be implemented as a Home Location Register (HLR), a Unified Database Management (UDM) device, a User Profile Server Function (USPF), or another type of network element that stores subscriber information. Additionally or alternatively, one or more components of wireless access network 130 may perform functions described as being performed by one or more other components of wireless access network 130.

Figure 3:
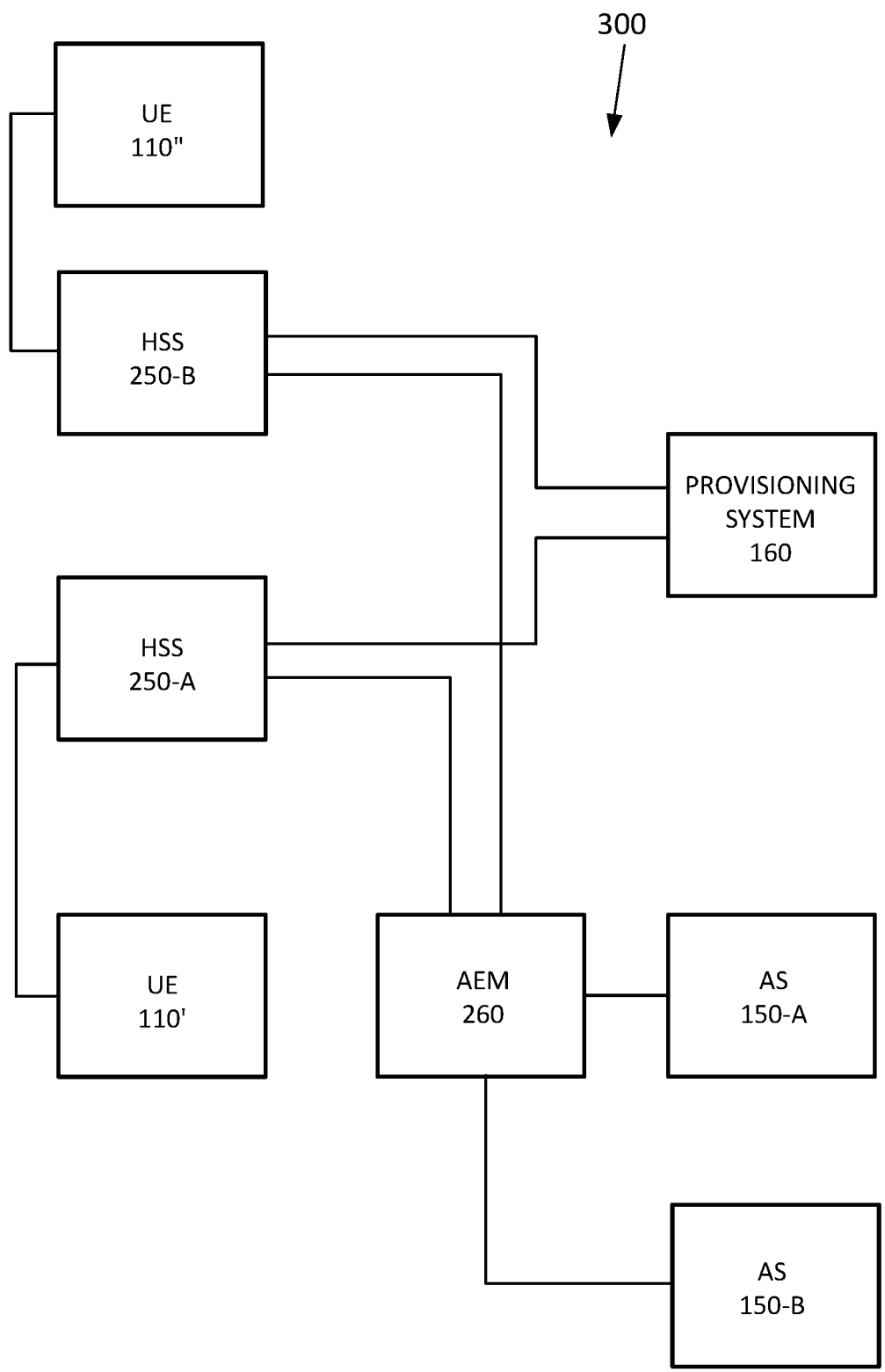
FIG. 3 is a diagram illustrating an exemplary configuration of the networks of FIG. 2.

FIG. 3 is a diagram illustrating an exemplary configuration 300 of UE 110, wireless access network 130, carrier network 140, and OSS network 165. As shown in FIG. 3, configuration 300 may include UE 110, AEM 260, AS 150, provisioning system 160, and HSS devices 250-A to 250-B, as well as other devices not shown. AEM 260 may communicate with AS 150, and HSS devices 250-A to 250-B. Each HSS device 250 may store subscriber profiles for a set of UE devices 110. In some implementations, different HSS devices 250 may be associated with different geographic areas, with different wireless access networks 130, and/or different types of UE devices 110. Additionally or alternatively, HSS devices 250 may be deployed for load balancing and/or resilience purposes and UE devices 110 may be distributed among HSS devices 250 by provisioning system 160.

Thus, when (at a Time T') a request to activate a new UE device 110' is received by the wireless carrier, provisioning system 160 may select a particular HSS 250 and may instruct the selected HSS 250 to store the subscriber profile for new UE device 110'. Information may then be sent to AEM 260 indicating which HSS 250 has been assigned to new UE device 110' and AEM 260 may record the information. AEM 260 may manage App lists based on App identifier information from AS 150 and may maintain metadata for each AP 150 that stores service data in a database for UE device 110' via a corresponding wireless service. AEM 260 may then create a mapping from the metadata to the data files stored at AS 150. Subsequently (at a time T"), provisioning system 160 may select a different HSS 250 (e.g., a new regional database) and may instruct the new HSS 250, instead of the original HSS 250, to store the subscriber profile for UE device 110". Information may then be sent to AEM 260 indicating the new HSS 250 has been assigned to UE device 110" and AEM 260 may record the information.

Although FIG. 3 shows exemplary components of configuration 300, in other implementations, configuration 300 may include fewer components, different components, differently arranged components, or additional components than depicted in FIG. 3. Additionally or alternatively, one or more components of configuration 300 may perform functions described as being performed by one or more other components of configuration 300.

Figure 4:
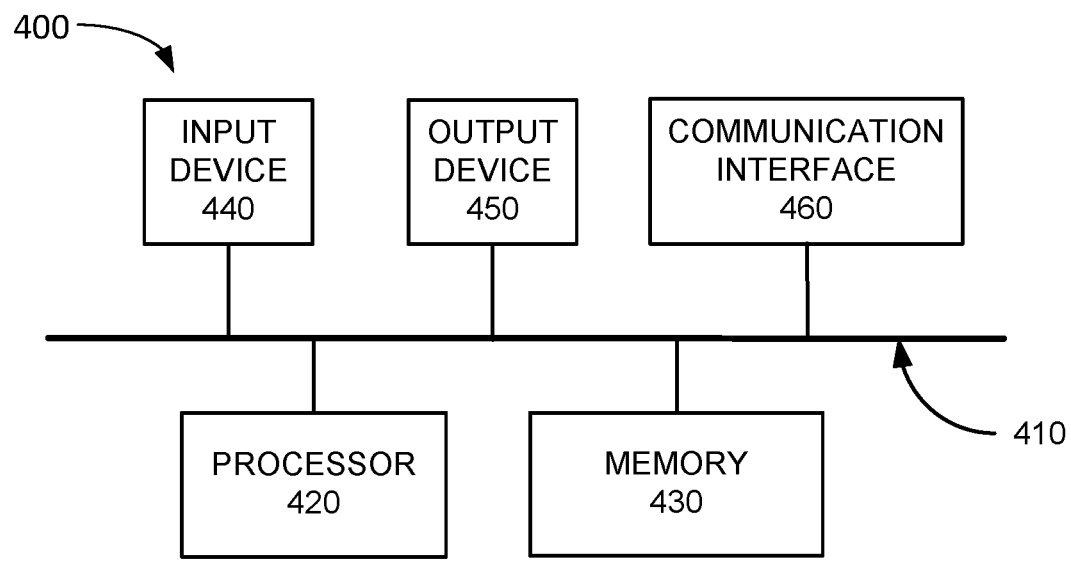
FIG. 4 is a diagram illustrating exemplary components of a device that may be used in an embodiment.

FIG. 4 is a diagram illustrating example components of a device 400 according to an implementation described herein. UE device 110, provisioning system 160, eNodeB 210, MME 220, SGW 230, PGW 240, HSS 250, AEM 260, and/or AS 150 may each include one or more devices 400. As shown in FIG. 4, device 400 may include a bus 410, a processor 420, a memory 430 (and logic 435), an input device 440, an output device 450, and a communication interface 460.

Bus 410 may include a path that permits communication among the components of device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include a liquid-crystal display (LCD) for displaying content to the customer. In some embodiments, device 400 may be managed remotely and may not include output device 450. In other words, device 400 may be headless and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals. Communication interface 460 may be coupled to an antenna for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi)

card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 400 may perform certain operations relating to the operation of an AEM device (e.g., AEM 260). Device 400 may perform these operations in response to processor 420 executing software instructions contained in a computer-readable medium, such as logic 435 included in memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions stored on memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than depicted in FIG. 4. Additionally or alternatively, one or more components of device 400 may perform one or more tasks described as being performed by one or more other components of device 400.

Figure 5:
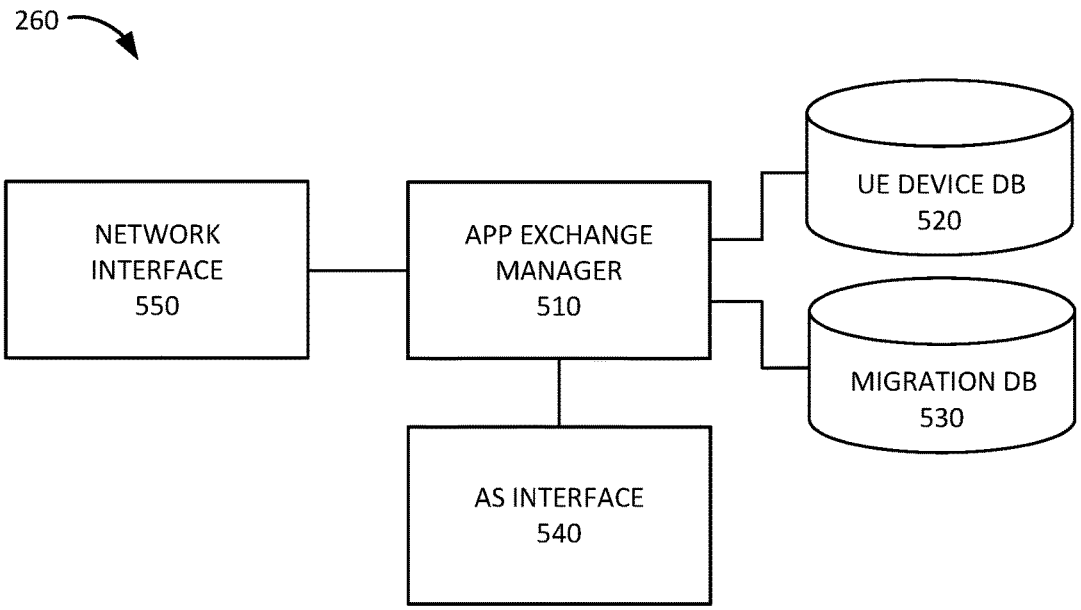
FIG. 5 is a diagram illustrating exemplary functional components of the App exchange management device of FIG. 2.

FIG. 5 is a diagram illustrating exemplary functional components of AEM 260. The functional components of AEM 260 may be implemented, for example, via processor 420 executing instructions from memory 430. Alternatively, some or all of the functional components included in AEM 260 may be implemented via hard-wired circuitry. As shown in FIG. 5, AEM 260 may include an App exchange manager 510, a UE device database (DB) 520, a migration DB 530, an AS interface 540, and network interface 550.

App exchange manager 510 may manage UE devices 110 accessing AS 150. For example, App exchange manager 510 may receive information from provisioning system 160 identifying a particular UE device 110 that is subject to re-homing with respect to a particular AS 150 and may store the re-homing status between UE device 110 and AS 150 in UE device DB 520. Thus, UE device DB 520 may store migration information associating a pairing between a previous AS 150 and a current AS 150.

Furthermore, App exchange manager 510 may send an App metadata request message to AS 150 in response to receiving a request from provisioning system 160 to initiate re-homing for a particular UE device 110. App exchange manager 510 may store the App metadata and migration information relating to the re-homing status (e.g., predetermined length of migration period) in migration DB 530. Exemplary information that may be stored in migration DB 530 is described below with reference to FIG. 6. App exchange manager 510 may then generate a mapping from the App metadata to the service data files stored in the AS 150 in the re-home status and may use the mapping to process data retrieval (e.g., read) messages received from UE device 110. App exchange manager 510 may generate a message including, for example, a UE device ID, an App ID, and/or a migration period to send to HSS 250 in response the re-homing request from provisioning system 160 to re-home UE device 110.

AS interface 540 may be configured to communicate with AS 150 using APIs 276. For example, AS interface 540 may migrate App service data files from AS 150 in re-home status via an API to current AS 150 for UE device 110 and/or may send a delete command to delete the migrated data files from AS 150 in re-home status.

Network interface 550 may be configured to send/receive messages with multiple HSS's 250. Network interface 550 may communicate with other devices via access network 130. As an example, network interface 550 may receive messages from provisioning system 160 via HSS 250 using a Diameter-based modified Sh interface 278 and may send messages to provisioning system 160 via HSS 250 using Sh interface 278. In some embodiments, Sh interface 278 may be implemented, for example, using a Diameter protocol.

Although FIG. 5 shows exemplary components of AEM 260, in other implementations, AEM 260 may include fewer components, different components, additional components, or differently arranged components than depicted in FIG. 5. Additionally or alternatively, one or more components of AEM 260 may perform one or more tasks described as being performed by one or more other components of AEM 260.

Figure 6:
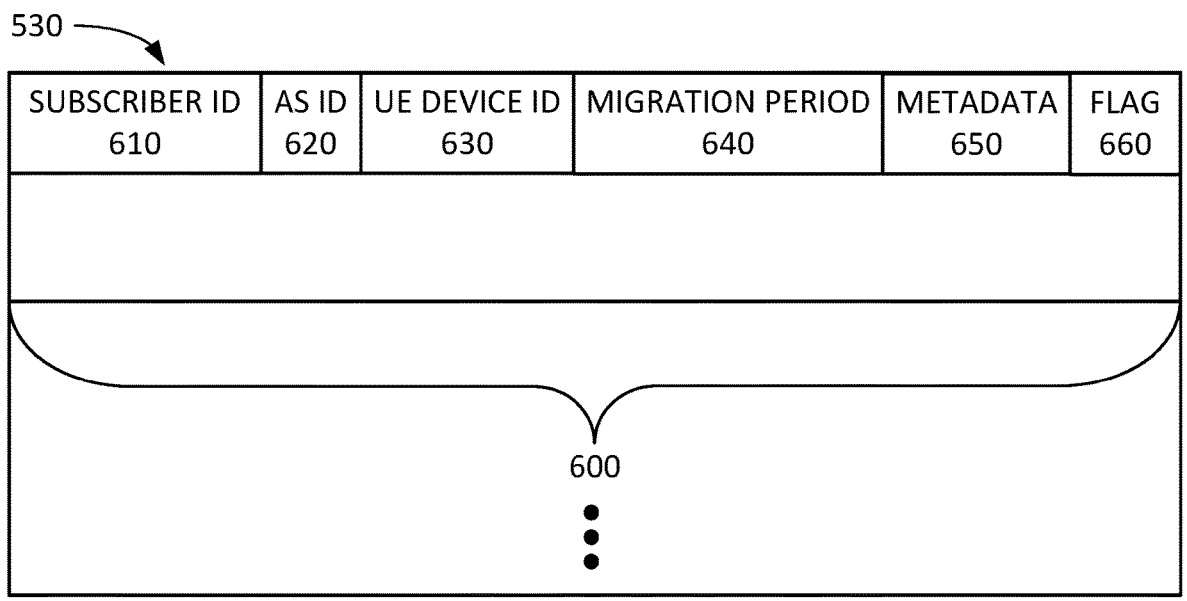
FIG. 6 is a diagram illustrating exemplary records of the migration DB of FIG. 5.

FIG. 6 is a diagram illustrating exemplary information of migration DB 530. As shown in FIG. 6, migration DB 530 may include one or more service migration records 600. Each of service migration records 600 may store information relating to a particular UE device 110. Service migration record 600 may include a number of fields, such as a subscriber ID field 610, an AS ID field 620, a UE device field 630, a migration period field 640, a metadata field 650, and a flag field 660. Other fields are possible. In some embodiments, the length and number of fields is configurable Subscriber ID field 610 may include an ID that uniquely identifies a subscriber that may own and/or operate a wireless device, such as UE device 110, and has subscribed to a wireless service from a wireless carrier such that the subscriber may use UE device 110 to communicate via a wireless carrier network. In some embodiments, a value in subscriber field 610 may be contained in multiple records 600 when a subscriber is associated with multiple user devices, and one or more of the other fields in a same record 600 may contain the same or different values. Further, in other embodiments, subscriber ID field 610 may include additional information, such as information identifying other members allowed to access the wireless network under the subscription plan.

AS ID field 620 may include information identifying a particular AS 150 associated with the subscriber. For example, AS ID field 620 may store a short code associated with the particular AS 150 that may be included in a message from UE device 110, an access point name (APN) associated with the particular AS 150, an Internet Protocol (IP) address associated with the particular AS 150, a descriptive name associated with the particular AS 150, and/or another type of AS identifier. Furthermore, in some implementations, AS ID field 620 may include an indication that service migration is active for one or more AS 150.

UE Device ID field 630 may include information identifying UE devices 110 that are associated with the subscriber. For example, for each particular UE device 110 that is a member of the subscriber's plan, UE device ID field 630 may include a Media Access Control (MAC) address, an Internet Protocol (IP) address, a Session Initiation Protocol (SIP) address, a Mobile Station International Subscriber Directory Number (MSISDN), an International Mobile Subscriber Identity (IMSI) number, a Mobile Directory Number (MDN); and/or by another type of ID associated with the particular UE device 110.

Migration period field 640 may include information that identifies a transition period for performing service migration with respect to a previously-assigned AS 150, during which, service data files are retrievable from AS 150 by the subscriber via a data file retrieval request using the wireless service. An entry in the migration period field 640 may specify an amount of time set for performing the service migration, a beginning and ending date/time for executing the service migration, etc. An entry in migration period field 640 may include data indicating a number of days, weeks, months, etc., and/or a billing cycle, multiple billing cycles, and/or a fraction thereof, etc.

Metadata field 650 may store information referencing a storage location of physical data (e.g., data files) written to AS 150 via a wireless service before the onset of service migration. For example, Metadata field 650 may include data schema such as a network address, a uniform resource identifier (URI), a timestamp, identification of one or more parties to a communication interchange, a storage format (e.g., file type), message data structure, etc.

Flag field 660 may store information indicating that a requested data file has or has not been previously retrieved from the old AS 150 and written to the new AS 150 within the migration period for service migration. For example, flag field 660 being set may direct AEM device 260 to the correct AS 150 to allow UE device 110 to access (e.g., read) the requested data file. In other embodiments, flag field 660 may be accessed by the old AS 150 and/or new AS 150, to determine whether the service migration period has expired and, if expired, on-demand service data retrieval operations may cease, and an error message returned in response to any read request received from UE device 110. In some embodiments, "setting" a flag may include entering a value of "one" or a value of "zero" in flag field 660.

Although FIG. 6 shows exemplary components of Migration DB 530, in other implementations, Migration DB 530 may include fewer components, different components, additional components, or differently arranged components than depicted in FIG. 6.

Figure 7:
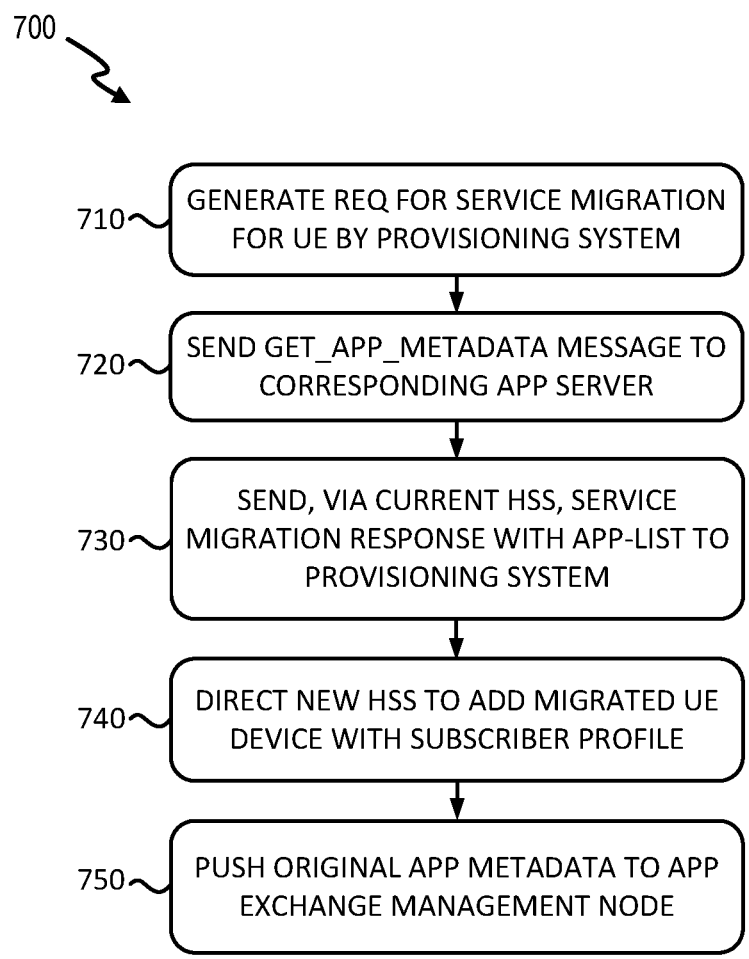
FIG. 7 is a flowchart of a process for wireless service migration according to an implementation described herein.

FIG. 7 is a flowchart of performing service migration for one or more wireless services in a wireless network according to an implementation described herein. In some implementations, the process 700 of FIG. 7 may be performed by AEM 260. In other implementations, some of the operations of FIG. 7 may be performed by another device or a group of devices separate from AEM 260, such as one or more other components of wireless access network 130, carrier network 140, and/or OSS network 165.

Process 700 of FIG. 7 may include provisioning system 160 generating a request to migrate UE device 110' from current AS 150-A to new AS 150-B (block 710). For example, wireless carrier personnel may, via a user interface of provisioning system 160, create/send a request to AEM 260, via HSS 250, to assign AS 150-B for UE device 110' that currently accesses a particular wireless service (e.g., an RCS messaging service) from AS 150-A. For example, App exchange manager 510 may receive the request via network interface 550, and the request may identify UE device 110' and specify a migration time period in which the service migration is to remain in effect.

Based on the request, App exchange manager 510 may send, via AS interface 540, a message to AS 150-A, which may be identified using UE device DB 520, requesting App metadata corresponding to the stored subscriber data files for the associated wireless service (block 720). In response, App exchange manager 510 may enter App metadata received from AS 150-A in service migration record 600 at migration DB 530, for example, and index with a subscriber ID, an AS ID, a UE device ID, the migration period, etc. App exchange manager 510 may then send a response, via the current HSS 250, to provisioning system 160 with an App-list identifying the Apps affected by the service migration (block 730).

As shown in FIG. 7, process 700 may further include provisioning system 160 instructing new HSS 250-B to add migrated UE device 110" to its database that contains subscriber-related and subscription-related information (block 740). For example, provisioning system 160 may send a command message to HSS 250-B that identifies UE device 110", an App-list, the migration period, etc. Based on the command, UE device 110" may be re-homed to HSS 250-B and added to its subscriber profile DB. HSS 250-B may push AS 150-A metadata to App exchange manager 510 (block 750).

Figure 8:
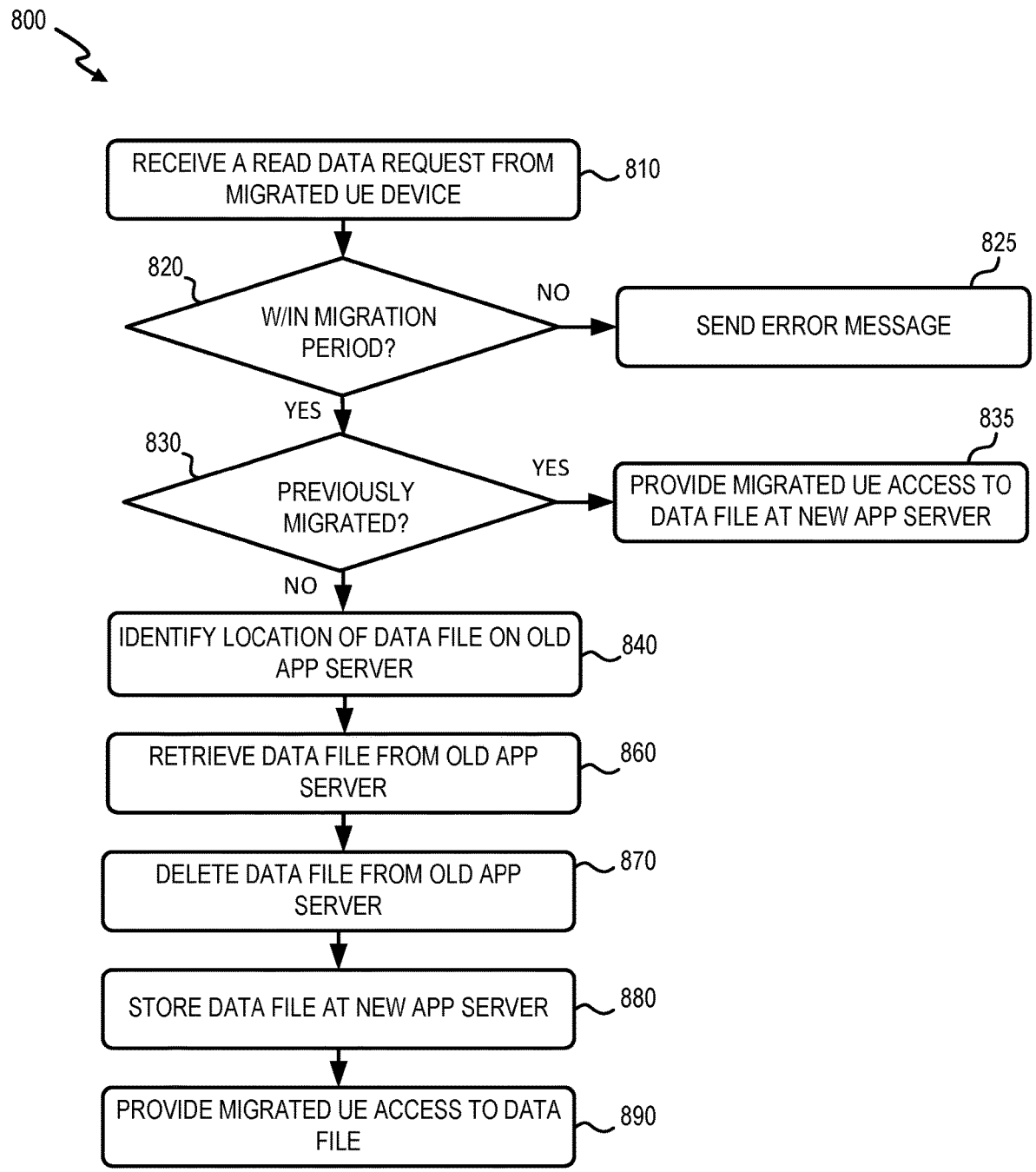
FIG. 8 is a flowchart of processing read request messages in a wireless network according to an implementation described herein.

FIG. 8 is a flowchart of processing messages for UE 110" in a wireless network according to an implementation described herein. In some implementations, the process of FIG. 8 may be performed by AEM 260. In other implementations, some or all of the process of FIG. 8 may be performed by another device or a group of devices separate from AEM 260, such as another component of wireless access network 130 and/or carrier network 140.

As shown in FIG. 8, process 800 may include receiving a read request for a service data file from UE device 110" (block 810). For example, AS 150-B may receive, via wireless access network 130, a request to access, for example, a visual voicemail message created using RCS messaging. AS 150-B may determine that the requested service data file was created before the service migration for UE device 110', and then forward the request to AEM device 260.

As shown in FIG. 8, process 800 may further include App exchange manager 510 determining whether the requested service data file is received within the applicable migration period (i.e., valid) that is set for the service migration of UE device 110 (block 820). For example, App exchange manager 510 may compare a timestamp for the service data request to an entry in the migration period field 640 of service migration record 600. If App exchange manager 510 determines that the request is not valid (block 820—NO), a notification (e.g., an error message) may be sent via network interface 550 to UE device 110" (block 825). Alternatively, if App exchange manager 510 determines that the request is valid (block 820—YES), App exchange manager 510 may determine whether the service data file has already been migrated to AS 150-B (block 830). For example, App exchange manager 510 may determine whether the flag field 660 of service migration record 600 is set. If App exchange manager 510 determines that the flag field 660 is set (block 830—YES), UE device 110" may be provided access to the service data file at AS 150-B (block 835).

As shown in FIG. 8, process 800 may further include App exchange manager 510 determining that the flag field 660 is not set (block 830—NO), and App exchange manager identifying a location of the service data file at AS 150-A (block 840). For example, App exchange manager 510 may consult an entry in metadata field 560 that corresponds to the service data file. Based on the location, App exchange manager 510 may retrieve, via AS interface 540, the service data file from AS 150-A (block 860), and delete the service data file such that the service data file is no longer stored at AS 150-A

(block 870). App exchange manager 510 may instruct, via AS interface 540, AS 150-B to store the service data file (block 880), and UE device 100" may be provided access to the service data file from AS 150-B.

Figure 9:
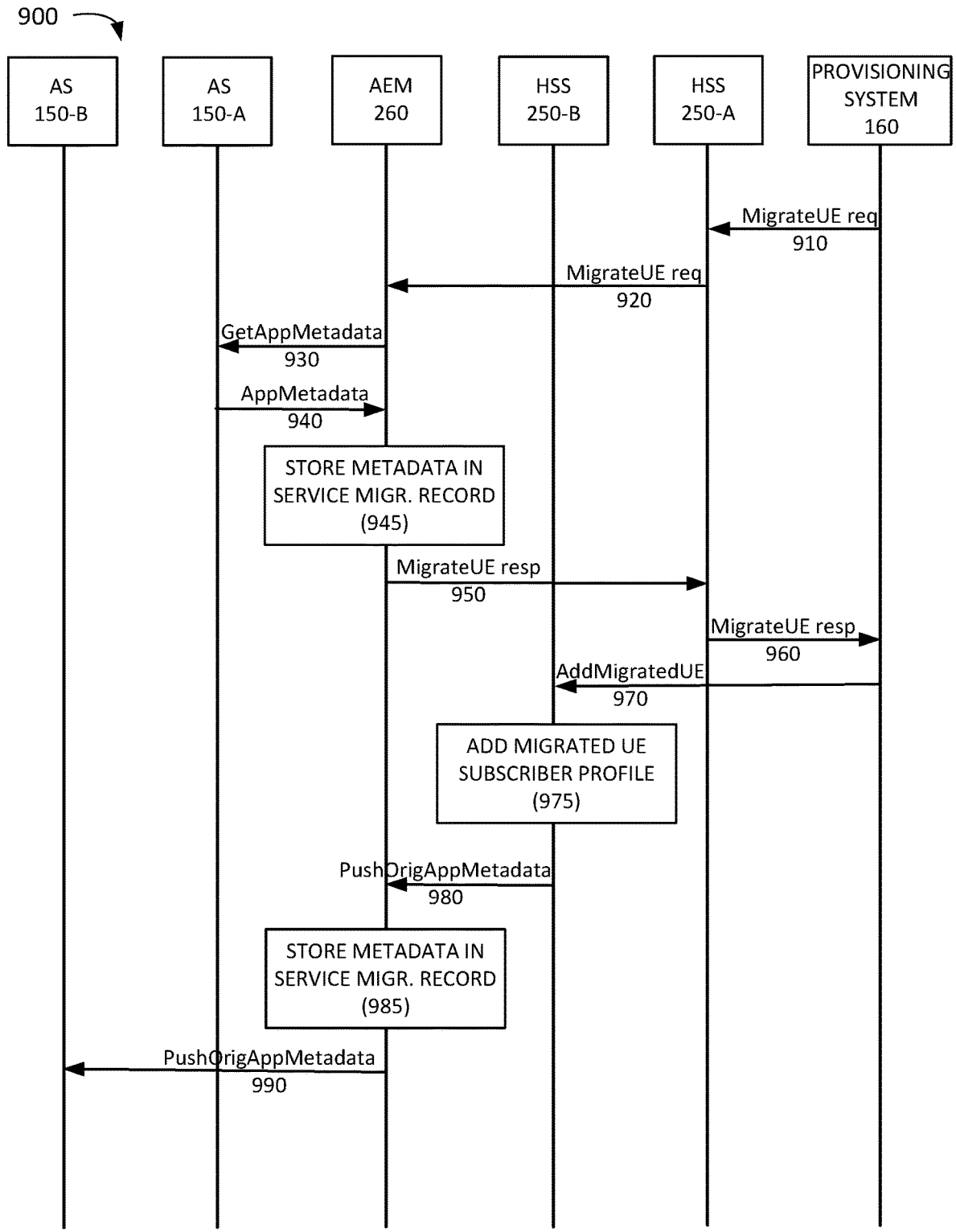
FIG. 9 is an exemplary signal flow for wireless service migration according to an implementation described herein.

FIG. 9 is an exemplary signal flow 900 associated with performing service migration for UE device 110. Signal flow 900 may include provisioning system 160 sending a request to HSS 250-A to activate service migration for UE device 110 (signal 910). The request may include a UE ID and an associated migration period or additional information. In response, HSS 250-A may select AEM device 260 to receive the request based on information in a subscriber profile corresponding to UE 110, and forward the request to AEM device 260 (signal 920). AEM device 260 may send a message to AS 150-A requesting metadata or data schema. For example, the message may include the UE ID, an APP ID, and/or the migration period (signal 930). In response, AS 150-A may return the requested information to AEM device 260 (signal 940). AEM device 260 may store the metadata in a service migration record 600, for example, in metadata field 650, for later use in data translation for on-demand retrieval (block 945).

Signal flow 900 may include AEM device 950 sending a response to the Migrate UE req to HSS 250-A, which may include the UE ID, an App-list, and/or the migration period (signal 950), and HSS 250-A may forward the response to provisioning system 160 (signal 960). Provisioning system 160 may send a command to HSS 250-B (signal 970), instructing HSS 250-B to add migrated UE device 110 as a device for which HSS 250-B maintains the corresponding subscriber profile. Based on the command, HSS 250-B then adds UE device, and HSS 250-A no longer maintains subscriber profile information of UE 110 (block 975). HSS 250-B may send a message including the original App metadata corresponding to the subscriber's stored service data to AEM device 260 (signal 980). AEM device 260 may store the metadata in a service migration record 600, for example, in metadata field 650, for later use in data translation for on-demand retrieval (block 985). AEM 260 may in turn forward the original App metadata to AS 150-B (signal 990).

Figure 10:
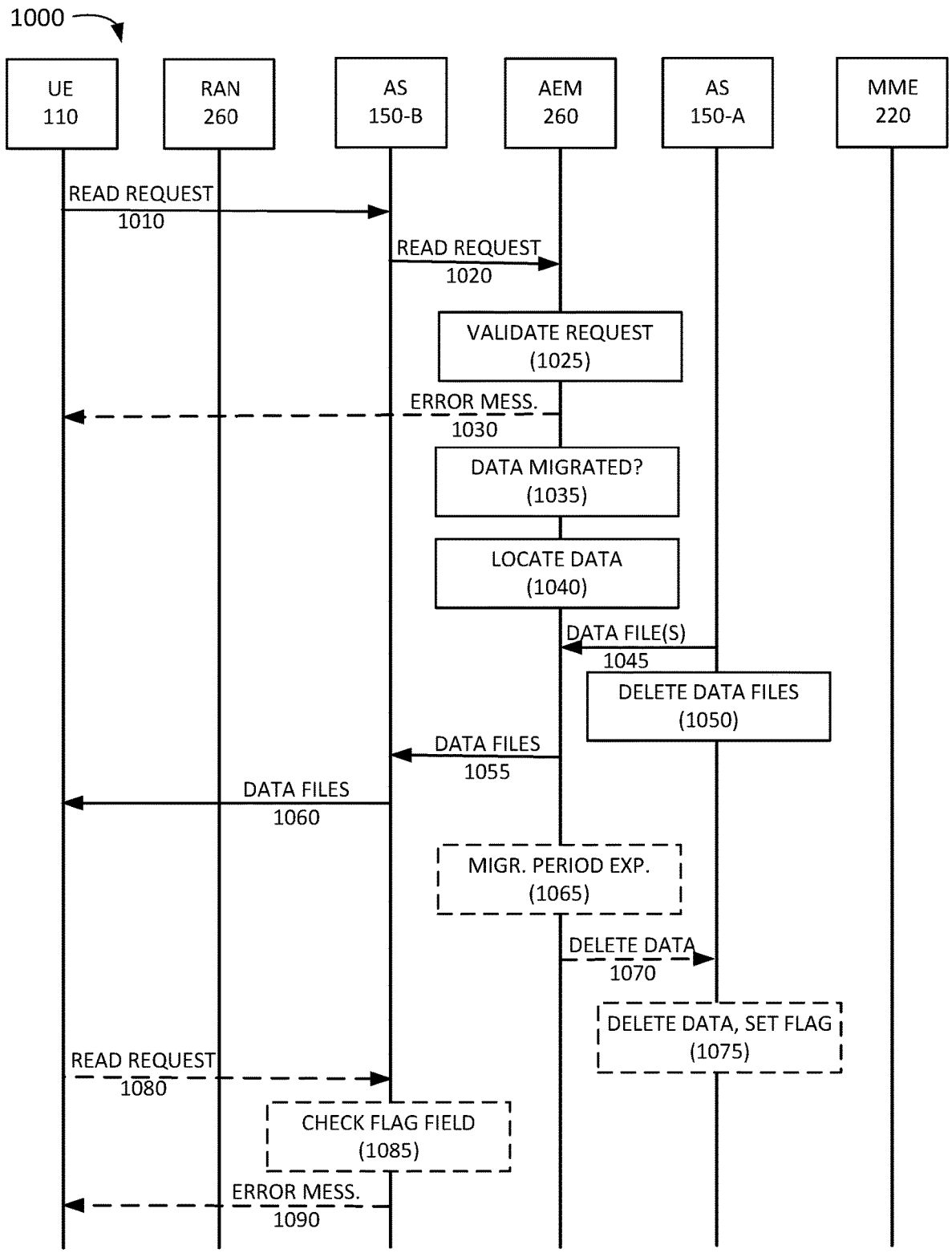
FIG. 10 is an exemplary signal flow of read request processing messages in a wireless network according to an implementation described herein.

FIG. 10 is an exemplary signal flow 1000 of processing read request messages for a UE 110 that is migrated as described in FIG. 9. Signal flow 1000 may include the subscriber sending a data retrieval request (e.g., read request) via a messaging application, for example, for a message stored at AS 150-B, using wireless access network 130 (signal 1010). AS 150-B may determine that the requested data file was generated pre-migration and therefore not stored at AS 150-B, and may forward the read request to AEM device 260 (signal 1020). AEM device 260 may receive the read request and determine whether the read request is received within the migration period associated with the migration from AS 150-A to AS 150-B (i.e., valid) (block 1025). If invalid, AEM device 260 may respond with an error message to UE 110 (signal 1030).

When AEM device 260 determines that the read request is valid, AEM device may then determine whether the data file has previously been migrated to the second destination application server (block 1035). For example, AEM device 260 may determine whether the requested data has been previously requested during the migration period and, as a result, already migrated to AS 150-B. If not already transferred, AEM device 260 may identify a location of the data file in AS 150-A by using, for example, metadata that is mapped to the physical data (e.g., data files) (block 1040).

Based on the identified storage location, AEM device 260 may retrieve the data file from AS 150-A (signal 1045), and the data file is deleted from AS 150-A (block 1050), the data file is then sent to and stored at AS 150-B (signal 1055), and access to the data file is provided to the subscriber (signal 1060). In some embodiments, when retrieving the requested data file, AEM device 260 may select for retrieval other, non-requested data files that are associated with the requested data files. For example, AEM device 260 may identify data files that are timestamped with a date/time that is within a configurable date range before and/or after a timestamp for the requested data file and/or identify data files that are in a message thread exchange with a same party associated with the requested data file.

In one or more embodiments, AEM device 260 may determine that the migration period has expired (block 1065), and AEM device 260 may instruct AS 150-A to delete any remaining data files related to the service migration (signal 1070). Based on the instruction, AS 150-A may delete any remaining service data associated with UE device 100 abd set flag field 660 of service migration record 600 (block 1075). Thereafter, an error message (signal 1090) may be generated and sent by AS 150-A in response to a read request (signal 1080) for the deleted service data, upon, for example, AS 150-A checking flag field 660 (block 1085) of service migration record 600, which may indicate that the requested data is no longer being stored.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of operations have been described with respect to FIGS. 7 and 8, and series of signal flows have been described with respect to FIGS. 9 and 10, the order of the operations and/or signal flows may be modified in other implementations. Further, non-dependent operations/signaling may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or an FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

What is claimed is:

1. A method comprising:
   receiving, by a network device from a user equipment (UE) device, one or more requests for service data of select service data stored via a wireless service in a wireless network, wherein the one or more requests include a user identifier (ID) associated with the UE device, and the select service data is associated with the user ID;
   determining, by the network device based on the user ID, whether the one or more requests are received within a designated migration period for migrating the select service data from a first application server to a second application server in the wireless network;
   generating, prior to an onset of the designated migration period, metadata for the select service data at the first application server;
   determining, by the network device and based on a determination that the one or more requests are received within the designated migration period, whether the requested service data has previously been migrated to the second application server;
   identifying, by the network device based on a determination that the requested select service data has not previously been migrated, a location of the requested select service data in the first application server using the metadata corresponding to the requested select service data;
   retrieving, by the network device, the requested select service data from the identified location;
   deleting, by the network device, the requested select service data from the first application server;
   migrating, by the network device, the requested select service data to the second application server;
   providing, by the network device, access to the UE device to the requested select service data; and
   deleting, by the network device from the first application server, an unrequested portion_of the select service data upon expiration of the designated migration period, wherein the requested select service data and the unrequested portion of the select service data correspond to an entirety of the select service data.

2. The method of claim 1, wherein the migrating comprises a service migration from the first application server to the second application server.

3. The method of claim 1, wherein none of the unrequested select service data is migrated from the first application server to the second application server in response to one or more requests from the UE device.

4. The method of claim 1, wherein the one or more requests indicate a date range associated with the select service data, and wherein retrieving the requested select service data from the identified location includes:
   retrieving, in addition to the requested select service data, a portion of the unrequested select service data that is within a same date range as the date range associated with the requested select service data.

5. The method of claim 1, wherein the one or more requests identify a party associated with the select service data, and wherein retrieving the requested select service data from the identified location includes:
   retrieving, in addition to the requested select service data, a portion of the unrequested select service data that is associated with the party identified in the requested select service data.

6. The method of claim 1, further comprising:
   receiving the designated migration period from a provisioning system in the wireless network in response to the UE device being rehomed from the first application server to the second application server.

7. The method of claim 1, further comprising:
   retrieving a portion of the unrequested select service data that is contained in a message thread exchange identified in the requested select service data.

8. A computer device comprising:
   a communication interface including a radio transceiver;
   a memory configured to store instructions; and
   a processor configured to execute the instructions to:
      receive, via the communication interface from a user equipment (UE) device, a-one or more requests for service data of select service data stored via a wireless service in a wireless network, wherein the one or more requests include a user identifier (ID) associated with the UE device, and the select service data is associated with the user ID;
      determine, based on the user ID, whether the one or more requests are received within a designated migration period for migrating the select service data from a first application server to a second application server in the wireless network;

generate, prior to an onset of the designated migration period, metadata for the select service data at the first application server;

determine, based on a determination that the one or more requests are received within the designated migration period, whether the requested select service data has previously been migrated to the second application server;

identify, based on a determination that the requested select service data has not previously been migrated, a location of the requested select service data in the first application server using the metadata corresponding to the requested select service data;

retrieve the requested select service data from the identified location;

delete the requested select service data from the first application server;

migrate the requested select service data to the second application server;

provide access to the UE device to the requested select service data; and delete, from the first application server, an unrequested portion of the select service data upon expiration of the designated migration period, wherein the requested select service data and the unrequested portion of the select service data correspond to an entirety of the select service data.

9. The computer device of claim 8, wherein the migrating comprises a service migration from the first application server to the second application server.

10. The computer device of claim 8, wherein none of the unrequested select service data is migrated from the first application server to the second application server in response to one or more requests from the UE device.

11. The computer device of claim 8, wherein the one or more requests indicate a date range associated with the select service data, and wherein to retrieve the requested select service data from the identified location, the processor is further configured to:

retrieve, in addition to the requested select service data, a portion of the unrequested select service data that is within a same date range as the date range associated with the requested select service data.

12. The computer device of claim 8, wherein the one or more requests identify a party associated with the select service data, and wherein to retrieve the requested select service data from the identified location, the processor is further configured to:

retrieve, in addition to the select service data, a portion of the unrequested select service data that is associated with the party identified in the requested select service data.

13. The computer device of claim 8, wherein the processor is further configured to:

receive the designated migration period from a provisioning system in the wireless network in response to the UE device being rehomed from the first application server to the second application server.

14. The computer device of claim 8, wherein the processor is further configured to:

retrieve a portion of the unrequested select service data that is contained in a message thread exchange identified in the requested select service data.

15. A non-transitory computer-readable memory device storing instructions that, when executed by a processor of a device, cause the processor to:

receive, from a user equipment (UE) device, one or more requests for service data of select service data stored via a wireless service in a wireless network, wherein the one or more requests include a user identifier (ID) associated with the UE device, and the select service data is associated with the user ID;

determine, based on the user ID, whether the one or more requests are received within a designated migration period for migrating the select service data from a first application server to a second application server in the wireless network;

generate, prior to an onset of the designated migration period, metadata for the select service data at the first application server;

determine, based on a determination that the one or more requests are received within the designated migration period, whether the requested select service data has previously been migrated to the second application server;

identify, based on a determination that the requested select service data has not previously been migrated, a location of the requested select service data in the first application server using the metadata corresponding to the requested select service data;

retrieve the requested select service data from the identified location;

delete the requested select service data from the first application server;

migrate the requested select service data to the second application server;

provide access to the UE device to the requested select service data; and delete, from the first application server, an unrequested portion of the select service data upon expiration of the designated migration period, wherein the requested select service data and the unrequested portion of the select service data correspond to an entirety of the select service data.

16. The non-transitory computer-readable memory device of claim 15, wherein the migrating comprises a service migration from the first application server to the second application server.

17. The non-transitory computer-readable memory device of claim 15, wherein none of the unrequested select service data is migrated from the first application server to the second application server in response to one or more requests from the UE device.

18. The non-transitory computer-readable memory device of claim 15, wherein the one or more requests indicate a date range associated with the select service data, and wherein to retrieve the requested select service data from the identified location, the instructions further cause the processor to:

retrieve, in addition to the requested select service data, a portion of the unrequested select service data that is within a same date range as the date range associated with the requested select service data.

19. The non-transitory computer-readable memory device of claim 15, wherein the one or more requests identify a party associated with the select service data, and wherein to retrieve the requested select service data from the identified location, the instructions further cause the processor to:

retrieve, in addition to the select service data, a portion of the unrequested service data that is associated with the party identified in the requested select service data.

20. The non-transitory computer-readable memory device of claim 15, wherein the instructions further cause the processor to:

retrieve a portion of the unrequested select service data that is contained in a message thread exchange identified in the requested select service data.

\* \* \* \* \*